United States Patent [19]

Hechtl et al.

[11] 4,096,159

[45] Jun. 20, 1978

[54] PROCESS FOR CONTROLLING THE RATE OF PLATINUM INDUCED ADDITION REACTION OF SILICON BONDED HYDROGEN ATOMS TO ORGANOPOLYSILOXANES CONTAINING ALIPHATIC UNSATURATION

[75] Inventors: Wolfgang Hechtl; Ernst Wohlfahrt, both of Burghausen; Richard Schmidlkofer, Mehring-Od, all of Germany

[73] Assignee: Wacker-Chemie GmbH, Munich, Germany

[21] Appl. No.: 838,414

[22] Filed: Sep. 30, 1977

[30] Foreign Application Priority Data

Oct. 15, 1976 Germany ............................. 2646726

[51] Int. Cl.$^2$ ............................................. C07F 7/08
[52] U.S. Cl. ............................................. 260/448.2 E
[58] Field of Search ................................... 260/448.2 E

[56] References Cited

U.S. PATENT DOCUMENTS

| 2,970,150 | 1/1961 | Bailey | 260/448.2 E |
| 3,933,880 | 1/1976 | Bergstrom et al. | 260/448.2 E |
| 3,933,882 | 1/1976 | Lee et al. | 260/448.2 E |
| 3,971,818 | 7/1976 | Lee et al. | 260/448.2 E |

Primary Examiner—Paul F. Shaver

[57] ABSTRACT

A process for controlling the rate of addition of silicon bonded hydrogen atoms to organopolysiloxanes containing aliphatic unsaturation which comprises mixing (1) an organopolysiloxane containing silicon bonded hydrogen atoms and/or (2) an organopolysiloxane containing at least 50 silicon atoms per molecule and having aliphatically unsaturated groups with at least one organosilicon compound of the formula

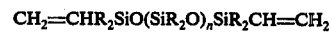

$$CH_2=CHR_2SiO(SiR_2O)_nSiR_2CH=CH_2$$

in which R is a hydrocarbon radical or a substituted hydrocarbon radical free of aliphatic unsaturation and $n$ is a number of from 0 to 6 prior to combining the organopolysiloxanes (1) and (2) in the presence of a platinum catalyst. The composition thus obtained has a substantially longer pot-life while only slightly extending the curing time.

5 Claims, No Drawings

PROCESS FOR CONTROLLING THE RATE OF PLATINUM INDUCED ADDITION REACTION OF SILICON BONDED HYDROGEN ATOMS TO ORGANOPOLYSILOXANES CONTAINING ALIPHATIC UNSATURATION

BACKGROUND OF THE INVENTION

It is generally known that platinum catalysts will accelerate the addition of compounds containing silicon bonded hydrogen atoms to compounds containing aliphatic unsaturation. In U.S. Pat. No. 3,419,593, Willing discloses that virtually any compound which contains an $\equiv$SiH group can be reacted with practically any compound which contains aliphatic multiple bonds in the presence of a platinum compound such as chloroplatinic acid. Also, it is shown for example, in U.S. Pat. No. 3,814,730 to Karstedt that compounds containing silicon hydrogen atoms can be added to organopolysiloxanes containing aliphatic multiple bonds and having at least 50 silicon atoms per molecule at room temperature.

Although the known platinum catalysts will substantially increase the cure rate of organopolysiloxane compositions, the "pot-life" or working time is also substantially reduced. Thus it would be desirable to provide a means for controlling the rate at which a platinum induced addition reaction of Si-bonded hydrogen atoms to an organopolysiloxane containing aliphatic unsaturation and having 50 silicon atoms per molecule can occur at room temperature so that a constant and predetermined rate of reaction can be obtained. This would provide adequate time between the preparation of the mixture and crosslinking, even though crosslinking occurs at temperatures below 40° C up to room temperature. Control of the reaction rate is of particular importance with respect to dental impression compounds consisting of diorganopolysiloxanes having terminal triorganosiloxy groups in which at least one terminal organic group is a vinyl group, organopolysiloxanes containing at least 3 Si-bonded hydrogen atoms per molecule, a platinum catalyst and other compounds such as fillers, if desired. Heretofore, it was necessary to prepare or obtain copolymers having vinyl groups in the diorganosiloxane units such as disclosed in U.S. Pat. No. 3,699,073 to Wada et al.

Therefore it is an object of this invention to provide a process for controlling the rate of addition of silicon bonded hydrogen atoms to compounds having aliphatic unsaturation. Another object of this invention is to provide a process for preparing organopolysiloxane compositions having a longer "pot-life" or working time. A further object of this invention is to provide a process for preparing organopolysiloxane compositions having a controlled rate of addition of silicon bonded hydrogen atoms to an organopolysiloxane containing aliphatic unsaturation and having at least 50 silicon atoms.

SUMMARY OF THE INVENTION

The foregoing objects and others which will become apparent from the following description are accomplished generally speaking, by a process for controlling the rate of platinum induced addition of Si-bonded hydrogen atoms at room temperature to organopolysiloxanes containing at least 50 silicon atoms per molecule and having aliphatic multiple bonds which comprises mixing (1) an organopolysiloxane containing Si-bonded hydrogen atoms and/or (2) organopolysiloxane containing at least 50 silicon atoms per molecule and having aliphatic multiple bonds with at least one organosilicon compound of the following formula:

$$CH_2=CHR_2SiO(SiR_2O)_nSiR_2CH=CH_2,$$

in which R represents the same or different monovalent hydrocarbon radicals or substituted monovalent hydrocarbon radicals which are free of aliphatic unsaturation and $n$ is a number of from 0 to 6 prior to combining the organopolysiloxanes (1) and (2) in the presence of the platinum catalyst.

DETAILED DESCRIPTION

The platinum catalyst employed in this invention may consist of finely dispersed platinum as well as all platinum compounds and/or all platinum complexes which have been used heretofore to promote the addition of Si-bonded hydrogen atoms to aliphatic multiple bonds. All of the platinum compounds and complexes as well as finely dispersed platinum induce the addition even at room temperature, although to a varying extent.

Examples of platinum catalysts which can be used in this invention are finely dispersed platinum or platinum which has been precipitated on carriers, such as silicon dioxide, aluminum oxide or activated charcoal, platinum halides, such as $PtCl_4$, chloroplatinic acid and $Na_2PtCl_4 \cdot n'H_2O$, platinum-olefin complexes, for example those with ethylene, propylene or butadiene, platinum-alcohol complexes, platinum-alcoholate complexes, platinum-ether complexes, platinum-aldehyde complexes, platinum-acetylacetonate, reaction products comprising chloroplatinic acid and monoketones, for example cyclohexanone, methyl ethyl ketone, acetone, methyl-n-propyl ketone, diisobutyl ketone, acetophenone and mesityl oxide, as well as platinum-vinylsiloxane complexes, such as platinum-divinyltetramethyldisiloxane complexes with or without a detectable amount of inorganic halogen.

It is possible to use mixtures comprising various platinum catalysts, for example a mixture consisting of the reaction product of chloroplatinic acid and cyclohexanone and a platinum-divinyltetramethyldisiloxane complex which is free of detectable inorganic halogen.

The platinum catalyst is generally employed in amounts of from 0.5 to 500 ppm by weight and preferably from 2 to 500 ppm by weight calculated as platinum and based on the total weight of the composition, including the silicon compounds, platinum catalyst and any additional materials.

In the process of this invention the Si-bonded hydrogen atoms can be present in the same Si-bonded hydrogen compounds which have been or could have been added to organosilicon compounds containing aliphatic multiple bonds. These compounds generally consist of units which can be represented by the general formula $$R'_mSiO_{4-m/2}$$

where R' represents hydrogen or is the same as R, in which at least 2 and preferably 3 Si-bonded hydrogen atoms are present per molecule and $m$ is 1, 2 or 3. Preferred compounds are those consisting of RHSiO-units, $R_2SiO-$ and $R_3SiO_{1/2}$-units in which an Si-bonded hydrogen atom is present for each 3 to 100 silicon atoms in said compounds, and have a viscosity of from 10 to 50,000 cP at 23° C.

The compounds containing Si-bonded hydrogen atoms which are used in the process of this invention may contain in addition to the compounds having the above formula, those which can be represented by the general formula $$R_2HSiO(SiR_2O)_pSiR_2CH=CH_2,$$

where R is the same as above and $p$ represents a value such that the viscosity of these diorganopolysiloxanes is 300 to 5,000 cP at 23° C.

It is preferred that the hydrocarbon radicals and substituted hydrocarbon radicals represented by R and R' each contain from 1 to 18 carbon atoms. Examples of suitable hydrocarbon radicals are alkyl radicals, such as the methyl, ethyl, n-propyl and isopropyl radicals, as well as octadecyl radicals; cycloalkyl radicals such as the cyclohexyl and the cycloheptyl radicals; aryl radicals such as the phenyl radical; alkaryl radicals such as the tolyl radicals and aralkyl radicals such as the benzyl and the beta-phenylethyl radicals. Examples of substituted hydrocarbon radicals R and R' are halogenated hydrocarbon radicals, such as the 3,3,3-trifluoropropyl radical and o-, p- and m-chlorophenyl radicals, as well as cyanoalkyl radicals such as the beta-cyanoethyl radical. Because of their availability, it is preferred that at least 50 percent of the R and R' radicals which do not consist of Si-bonded hydrogen be methyl radicals.

Compounds containing silicon bonded hydrogen atoms are preferably used in amounts such that from 0.1 to 15 Si-bonded hydrogen atoms are present per aliphatic multiple bonds.

The organopolysiloxanes which have aliphatic multiple bonds and contain at least 50 silicon atoms per molecule used in the process of this invention can be the same organopolysiloxanes which have been added to or could have been added heretofore to compounds containing Si-bonded hydrogen atoms. These organipolysiloxanes generally contain units which can be represented by the general formula $$R''_xSiO_{4-x/2}$$

in which R" represents the same or different monovalent, or substituted monovalent hydrocarbon radicals; with at least 2 of the R" radicals having aliphatic multiple bonds per molecule, $x$ is 0, 1, 2 or 3, with the provision that the average value of $x$ is 0.9 to 2.1 and, or course at least 50 silicon atoms be present per molecule.

In the above formula when R" is free of aliphatic multiple bonds, then the individual examples enumerated for radicals R and R' are equally applicable to the radicals represented by R"'.

Examples of hydrocarbon radicals R" having aliphatic multiple bonds are the ethinyl, vinyl, allyl, methallyl and butadienyl radicals, with vinyl being the preferred radical.

Since the average values for $x$ are from 0.9 to 2.1, elastomers as well as non-elastomers, i.e. resin-like products can be prepared from mixtures whose crosslinking or curing speed is controlled in accordance with this invention. The preparation of elastomers is however preferred. Therefore it is a preferred embodiment of this invention that the organopolysiloxanes which contain at least 50 silicon atoms per molecule and have aliphatic multiple bonds be those represented by the general formula $$CH_2=CHR_2SiO(SiR_2O)_ySiR_2CH=CH_2$$

where R is the same as above and $y$ is an integer having a value of at least 48. There is no critical maximum value for $y$. The viscosity of these diorganopolysiloxanes can thus for example be up to $10^8$cP at 23° C or more.

Organosilicon compounds which are employed to control the rate of addition may be represented by the formula $$CH_2=CHR_2SiO(SiR_2O)_nSiR_2CH=CH_2$$

in which $n$ is preferably 0, 1 or 2 and each R is a methyl radical. Disiloxanes such as 1,3-divinyl-1,1,3,3-tetramethyldisiloxane and 1,3-divinyl-1,1,3,3-tetramethyldisiloxane may be used. The compound 1,3-divinyl-1,1,3,3-tetramethyldisiloxane is preferred because this compound can be easily obtained from the hydrolysis of vinyldimethylchlorosilane and due to its relatively low boiling point, it can be easily purified by distillation in order to obtain a uniform product. Moreover this compound considerably increases the timespan after the preparation of the mixture containing organopolysiloxanes having aliphatic multiple bonds, Si-bonded hydrogen atoms and the platinum catalyst, and crosslinking.

An additional example of an organosilicon compound corresponding to the general formula $$CH_2=CHR_2SiO(SiR_2O)_nSiR_2CH=CH_2$$

is 1,3-divinyl-1,3-diphenyl-1,3-dimethyldisiloxane.

Products in which $n$ is a number having a value of from 1 to 6, can for example be prepared by equilibrating organopolysiloxanes corresponding to the formula $$HO(R_2SiO)_{n''}H,$$

where R is the same as above and $n''$ represents a number whose value is such that the viscosity of the diorganopolysiloxanes is at least $10^6$ cP at 23° C, with 1,3-divinyl-1,1,3,3-tetramethyldisiloxane or 1,3-divinyl-1,3-diphenyl-1,3-dimethyldisiloxane. The products thus obtained can be used either with or without further purification.

It is preferred that the compound corresponding to the formula $$CH_2=CHR_2SiO(SiR_2O)_nSiR_2CH=CH_2$$

be used in amounts of from 1 to 5,000 ppm by weight, and more preferably from 1 to 1,000 ppm by weight, based on the total weight of the composition, i.e., the weight of all the organosilicon compounds, the platinum catalyst and any other substances which may be employed. The greater the amount used within the above range, the longer the time after the preparation of the mixture consisting of organopolysiloxanes having aliphatic multiple bonds, Si-bonded hydrogen containing compounds and platinum catalyst and any detectable crosslinking. This time is generally referred to as the "pot-life".

The compound corresponding to the following formula $$CH_2=CHR_2SiO(SiR_2O)_nSiR_2CH=CH_2$$

can be used as such, i.e. in a more or less pure form. However in order to facilitate mixing and to achieve uniform dispersion in the organosilicon compounds it can also be used in the form of a paste. Such a paste can for example be prepared by mixing a compound having the general formula $$CH_2=CHR_2SiO(SiR_2O)_nSiR_2CH=CH_2$$

with a diorganopolysiloxane which is liquid at room temperature and which contains terminal triorganosiloxy groups, especially a diorganopolysiloxane which is end-blocked by trimethylsiloxy groups, and silicon dioxide having a surface area of at least 50 m²/gm (measured by nitrogen adsorption in accordance with ASTM Special Bulletin No. 51, 1941, page 95 which is generally referred to as the "BET" method). However instead of a dimethylpolysiloxane which is end-blocked by trimethylsiloxy groups, it is possible to use an organopolysiloxane having at least 50 silicon atoms per molecule containing aliphatic multiple bonds in the preparation of the paste. The silicon dioxide having a surface area of at least 50 m²/gm can be precipitated or fume silica. The silicon dioxide can for example be treated with organohalosilanes, organoalkoxysilanes or hexorganodisilazanes to impart hydrophobic properties thereto.

It is very surprising that when an organopolysiloxane compound containing Si-bonded hydrogen atoms and/or at least 50 silicon atoms per molecule and aliphatic multiple bonds is mixed with at least one compound corresponding to formula $$CH_2=CHR_2SiO(SiR_2O)_nSiR_2CH=CH_2,$$

especially 1,3-divinyl-1,1,3,3-tetramethyldisiloxane, the platinum catalyst induced addition at room temperature of Si-bonded hydrogen atoms to an organopolysiloxane having at least 50 silicon atoms per molecule and aliphatic multiple bonds is reduced to a substantial extent. This is especially surprising since U.S. Pat. No. 3,814,730 discloses that platinum complexes of compounds having the above formula, especially, 1,3-divinyl-1,1,3,3-tetramethyldisiloxane are particularly effective at room temperature.

The process of this invention is preferably carried out at room temperature and at atmospheric pressure, i.e., at 760 mm Hg (abs.) or at approximately 760 mm Hg (abs.). Nevertheless, temperatures which are lower or higher than room temperature and/or pressures below or above atmospheric pressure may also be used.

By controlling the speed of the platinum induced addition at room temperature of a compound having Si-bonded hydrogen atoms to an organopolysiloxane having at least 50 silicon atoms per molecule and containing aliphatic multiple bonds, it is possible to achieve any desired pot-life, while still using a constant quantity of catalyst, e.g., 1.5 ppm, without catalyst poisoning.

The extended pot life which is controlled by the process of this invention and the speed with which the addition of Si-bonded hydrogen atoms to aliphatic multiple bonds takes place remains fairly constant even after considerable time has elapsed between the mixing of a compound having the following formula $$CH_2=CHR_2SiO(SiR_2O)_nSiR_2CH=CH_2$$

with a compound containing Si-bonded hydrogen atoms and/or organopolysiloxanes having at least 50 silicon atoms per molecule and containing aliphatic multiple bonds, and the mixing together of all the reaction components.

Conversely, after storage, the pot life can vary to a considerable extent, especially at relatively high temperatures, when a compound having the following general formula $$CH_2=CHR_2SiO(SiR_2O)_nSiR_2CH=CH_2$$

is omitted.

In addition to the compound having Si-bonded hydrogen atoms, the diorganopolysiloxane having at least 50 silicon atoms per molecule containing aliphatic multiple bonds, the platinum catalyst and a compound having the general formula $$CH_2=CHR_2SiO(SiR_2O)_nSiR_2CH=CH_2$$

as well as other materials such as used in the preparation of the paste, the process of this invention may include other substances which have been used or could have been used heretofore in the preparation of elastomeric and non-elastomeric compositions. Examples of such other substances which can be used in the process are fillers having a surface area of at least 50 m²/gm, possibly in addition to the previously mentioned silicon dioxide which is used for the preparation of pastes, fillers having a surface of less than 50 m²/gm, pigments, soluble dyes, emollients, pure organic resins, agents which improve the adhesion of the addition products on the surfaces on which they are produced, agents which delay crosslinking, other than the agents which are used to control the speed of addition in accordance with this invention as well as flavoring and scenting agents.

Examples of fillers having a surface area of less than 50 m²/gm are calcium carbonate, quartz meal, cristobalite meal, diatomaceous earth and aluminum silicate, as well as graphite, with the latter being an example of a filler which is electrically conductive in addition to having a surface area of less than 50 m²/gm. At least a portion of the fillers having a surface area of less than 50 m²/gm and/or fillers having a surface of at least 50 m²/gm can be hydrophobic.

Examples of suitable pigments are pigment grade ferrous oxide and titanium oxide.

Examples of emollients are organopolysiloxanes which are free of aliphatic multiple bonds, as well as trimethylsiloxy end-blocked dimethylpolysiloxanes which are liquid at room temperature. These dimethylpolysiloxanes may be used in addition to the organopolysiloxane which is employed in the preparation of the previously mentioned pastes.

An example of a pure organic resin is polyvinyl chloride powder.

Examples of agents used for improving the adhesion of the addition products on the surfaces on which they are produced, are glycidyloxypropyltrialkoxysilanes, tetramethyltetrakis-(glycidyloxypropyl)-cyclotetrasiloxane and methacryloxypropyltrialkoxysilanes.

Examples of organopolysiloxane resins which can be used in the process of this invention which makes it possible to control the speed with which the elastomers crosslink, are copolymers consisting of $SiO_{4/2}-$, $(CH_3)_3SiO_{1/2}-$ and $(CH_3)_2(CH_2=CH)SiO_{1/2}-$ units, which contain from 1.5 to 3.5 percent by weight of vinyl groups and which have a total of 0.6 to 1

$(CH_3)_3SiO_{1/2}-$ and $(CH_3)_2(CH_2=CH)SiO_{1/2}-$ units per $SiO_{4/2}$ units.

Another example of an agent which delays crosslinking, other than the organosilicon compounds employed in this invention to control the rate of addition is benzotriazole.

It is preferred that at least a portion of the organopolysiloxane containing at least 50 silicon atoms per molecule and having aliphatic multiple bonds, be mixed with the platinum catalyst prior to the addition of the compound corresponding to the general formula $$CH_2=CHR_2SiO(SiR_2O)_nSiR_2CH=CH_2.$$

Compositions whose crosslinking or curing rate is controlled in accordance with this invention can be used not only as dental impression or molding compositions, but also as casting or embedding compositions for electronic components. During mass production and coating of components by automatic immersion, the constant pot-life achieved in accordance with the process of this invention is of particular advantage. Likewise, when sealing and insulation compositions are used and when terminals for cable, adhesive repellent agents, fabric coatings and electrical heating elements are manufactured, a composition having a constant pot-life is extremely important.

In the following examples all parts are by weight unless otherwise specified.

A mixture consisting of a platinum-vinylsiloxane complex and a diluent, which is used in Examples 2 through 5, is prepared in the following manner: About 20 parts by weight of sodium bicarbonate are added to a mixture containing $H_2PtCl_6.6H_2O$, 20 parts by weight of 1,3-divinyl-1,1,3,3-tetramethyldisiloxane and 50 parts by weight of ethanol. The mixture is refluxed for 30 minutes with constant agitation, allowed to stand for 15 hours, and then filtered. The volatile components are distilled off the filtrate at approximately 12 mm Hg (abs.). The residue consisting of 17 parts by weight of a liquid is dissolved in benzene. The solution is filtered and the benzene distilled off the filtrate. The residue is mixed with a dimethylpolysiloxane having terminal vinyldimethylsiloxane units and a viscosity of 1,400 cP at 23° C, as a diluent, in such an amount that the mixture contains 1 percent by weight of platinum, calculated as elemental platinum.

EXAMPLE 1

(a) About 500 gm of a mixture containing the following:

480 gm of a dimethylpolysiloxane having terminal vinyldimethylsiloxane units and a viscosity of 21,000 cP at 23° C.
810 gm cristobalite meal,
9 gm of hydrophobic, pyrogenically produced silicon dioxide, and
13 gm of pigment grade titanium dioxide;

are mixed with 9.35 gm of a platinum catalyst solution which contains 0.1 percent by weight of platinum, calculated as elemental platinum. The solution is prepared by mixing 0.2 mg of $PtCl_4$ in 3 ml of anhydrous ethanol with 113.6 gm of a dimethylpolysiloxane having terminal vinyldimethylsiloxane units and a viscosity of 1,100 cP at 23° C and thereafter the ethanol is removed by distillation at 30° C at 0.2 mm Hg (abs.).

The organopolysiloxane mixture thus obtained which contains more than 50 silicon atoms per molecule and has aliphatic multiple bonds and has been mixed with a filler and a platinum catalyst in which the mixture contains 18.4 ppm by weight of platinum, calculated as an elemental platinum, is first mixed with 25 ppm by weight based on the total weight of the mixture, of 1,3-divinyl-1,1,3,3-tetramethyldisiloxane and subsequently with 3 percent by weight based on the total weight of the mixture, of a copolymer consisting of dimethylsiloxane, methylhydrogensiloxane and trimethylsiloxane units, having a viscosity of 730 cP at 23° C and 0.12 percent by weight of an Si-bonded hydrogen compound. The pot-life or processing time of the composition is 2 minutes and 50 seconds. After 8 minutes the composition cures to form an elastomer having a Shore-A-hardness of 52.

COMPARISON EXAMPLE

For comparison purposes the procedure described in Example 1 (a) is repeated, except that divinyltetramethyldisiloxane is omitted. Crosslinking is observed and the pot-life is terminated in about 20 seconds after the organopolysiloxane has been mixed with the Si-bonded hydrogen compound.

EXAMPLE 2

9 parts by weight of a mixture containing 1,000 gm of a dimethylpolysiloxane having vinyldimethylsiloxane terminal units and a viscosity of 980 cP at 23° C and 4 gm of the mixture of platinumvinylsiloxane complex and diluent which contains 1 percent by weight of platinum, whose preparation was described above, are first mixed with 1,3-divinyl-1,1,3,3-tetramethyldisiloxane in the amount shown in Table 1, and then 1 part of the organopolysiloxane containing Si-bonded hydrogen described in Example 1 is added. The following Table shows the pot-life and the crosslinking time required until the elastomers are no longer tacky.

TABLE 1

| mg of divinyltetramethyldisiloxane per 100 gm of polysiloxane having a viscosity of 980 cP at 23° C. | Pot-Life | | Time required until elastomers are no longer tacky |
|---|---|---|---|
| 0 | 4.5 | | 10 minutes |
| 20 | 30 | minutes | 40 minutes |
| 50 | 1.5 | hours | 2 hours |
| 100 | 2 | hours | 3 hours |
| 200 | 5 | hours | 7.5 hours |

EXAMPLE 3

A portion of a composition (A) comprising the following:

1635 gm of a dimethylpolysiloxane having terminal vinyldimethylsiloxane units and a viscosity of 960 cP at 23° C,
1296 gm cristobalite meal,
39 gm pyrogenically produced silicon dioxide which has been rendered hydrophobic and
24 gm of the mixture of platinum-vinylsiloxane complex and diluent containing 1 percent by weight of platinum, whose preparation was described above and which mixture contains 80 ppm by weight of platinum, calculated as platinum, is mixed with the short-chain divinylsiloxanes shown in the following table. The resultant mixture (A) is then mixed in a ratio of 1 percent by weight of mixture (A) with 1 percent by weight of mixture (B) containing the following ingredients.

1513 gm of dimethylpolysiloxane having terminal vinyldimethylsiloxane units and a viscosity of 960 cP at 23° C,
1370 gm cristobalite meal,
53 gm pyrogenically produced silicon dioxide which has been rendered hydrophobic and
450 gm of a copolymer consisting of dimethylsiloxane, methylhydrogensiloxane and trimethylsiloxane units, with a viscosity of 800 cP at 23° C and 9.125 percent by weight of Si-bonded hydrogen.

The pot-life of the respective compositions shown in the following table are determined at a temperature of 24° C.

TABLE 2

| Short Chain Divinylsiloxane | PPM by weight based on the weight of composition (A) of the short-chain divinylsiloxane | Pot-Life |
|---|---|---|
| $CH_2=CH(CH_3)_2SiOSi(CH_3)_2CH=CH_2$* | 91 | 3 min. 35 sec. |
| $CH_2=CH(CH_3)_2SiOSi(CH_3)$-$_2OSi(CH_3)_2CH=CH_2$** | 167 | 3 min. 40 sec. |
| $CH_2=CH(CH_3)_2[SiOSi(CH_3)_2]$-$_2OSi(CH_3)_2CH=CH_2$ | 500 | 3 min. 50 sec. |
| $CH_2=CH(CH_3)_2[SiOSi(CH_3)_2]$-$_4OSi(CH_3)_2CH=CH_2$ | 1000 | 3 min. 10 sec. |
| — | 0 | 2 min. 10 sec. |

*Distilled product having a purity of 98.7 percent by weight.
**Prepared by mixing 74 gm of a dimethylpolysiloxane having terminal Si-bonded hydroxyl groups and a viscosity of 400 cP at 23° C with 0.01 ml of a solution consisting of 25 parts by weight of phosphoronitrile chloride in 75 parts by weight of methylene chloride. The resultant mixture was allowed to stand for 16 hours at room temperature and at 12 mm Hg (abs.). The composition thus obtained which is solid at room temperature, was mixed with 186 gm of 1,3-divinyl-1,1,3,3-tetramethyldisiloxane and stirred for 24 hours at room temperature. The short-chain divinylsiloxane thus obtained has a viscosity of 1.6 cSt at 25° C. It was used without additional purification. The other short-chain divinylsiloxanes consisting of vinyldimethylsiloxane and dimethyl-siloxane units were similarly prepared and used without further purification.

EXAMPLE 4

(a) A mixture consisting of a dimethylpolysiloxane having terminal vinyldimethylsiloxane units and a viscosity of 20,000 cP at 23° C and 70 ppm by weight of platinum, calculated as platinum, in the form of the mixture having 1 percent by weight of platinum which consists of a platinum-vinylsiloxane complex and a diluent, whose preparation was described heretofore above, is mixed with 40 ppm by weight of 1,3-vinyl-1,1,3,3-tetramethyldisiloxane. A portion of the composition thus obtained is stored for 24 hours at room temperature, while the remainder of the mixture is stored for 24 hours in a drying chamber at a temperature of 100° C. Each mixture is then mixed with 5 percent by weight based on the weight of the organopolysiloxane containing Si-bonded hydrogen atoms described in Example 1.

COMPARISON EXAMPLE

The process described in Example 4(a) above is repeated, except that divinyltetramethyldisiloxane is omitted.

The pot-life of the respective composition is determined at 23° C.

TABLE 3

| | Pot-life following storage at | |
|---|---|---|
| Example | Room temperature | 100° C |
| 4(a) | 3 min. 15 sec. | 3 min. 30 sec. |

TABLE 3-continued

| | Pot-life following storage at | |
|---|---|---|
| Example | Room temperature | 100° C |
| Comparison | 1 min. 55 sec. | 3 min. 25 se c. |

EXAMPLE 5

(a) About 500 gm of a dimethylpolysiloxane having terminal Si-bonded hydroxyl groups and a viscosity of 400 cP at 25° C are mixed with 8 gm of a methylhydrogen polysiloxane which is end-blocked with trimethylsiloxy units and which has a viscosity of 33 cP at 25° C, and 0.07 ml of a solution consisting of 4 gm of phosphoronitrile chloride obtained by reacting 2 mol of phosphoropentachloride with 1 mol of ammonium chloride, in 10 ml of methylene chloride, The mixture is allowed to stand overnight at room temperature at 12 mm Hg (abs.). The composition thus obtained which is solid at room temperature, is mixed with 10 gm of a dimethylpolysiloxane which is end-blocked with trimethylsiloxy units and which has an average of about 12 Si-atoms per molecule. The mixture is heated to 60° C over a period of 12 hours and under constant agitation. The resultant organopolysiloxane consists of methylhydrogensiloxane, dimethylsiloxane and trimethylsiloxane units and contains approximately 1 Si-bonded hydrogen atom for each 50 Si-atoms and has a viscosity of 9,300 cP at 25° C.

(b) About 100 gm of a dimethylpolysiloxane having terminal Si-bondedhydroxyl groups and a viscosity of 400 cP at 25° C, are mixed with 0.15 ml of the phosphoronitrile chloride solution described in Example 5 (a) above. The mixture is allowed to stand for 3 hours at 50° C at 12 mm GH (abs.). The resultant composition, which is solid at room temperature, is mixed with 4.2 gm of sym-divinyltetramethyldisiloxane and 3.1 gm of sym-tetramethyldihydrogendisiloxane and stirred for 24 hours at room temperature. The dimethylpolysiloxane thus obtained which on the average has one vinyldimethylsiloxane and one dimethylhydrogensiloxane terminal unit per molecule has a viscosity of 2,000 cP at 25° C.

(c) A mixture consisting of 150 gm of the organopolysiloxane whose preparation is described in Example 5 (a) above, 30 gm of hexamethyldisilazane, 10 gm of water and 150 gm of silicon dioxide which was pyrogenically produced in the gaseouso phase and which has a surface area of 130 m²/gm are placed in a kneading machine and kneaded at a temperature of about 150° C at 50 mm Hg (abs.) to remove the volatile components. The composition is cooled and then mixed with 300 gm of the diorganopolysiloxane prepared in accordance with Example 5(b).

(d) About 90 gm of the mixture thus obtained is mixed with 10 gm of a dimethylpolysiloxane having terminal vinyldimethylsiloxane units and a viscosity of 162 cP at 23° C which had previously been mixed with 400 ppm by weight of platinum (calculated as platinum) in the form of the 1 percent by weight of the platinum-vinyl-siloxane complex and diluent, whose preparation has been described and subsequently mixed with 7,000 ppm by weight of 1,3-divinyl-1,1,3,3-tetramethyldisiloxane.

COMPARISON EXAMPLE 1

The process described in Example 5(d) is repeated, except that the divinyltetramethyldisiloxane is omitted.

COMPARISON EXAMPLE 2

The process described in Example 5(d) is repeated, except that the divinyltetramethyldisiloxane is omitted and only 15 ppm by weight of platinum is used (calculated as platinum).

Based on the total weight of all the organosilicon compounds employed, the platinum catalyst and all other substances contained in the finished composition which can be crosslinked so as to form an elastomer, the amount of platinum, calculated as platinum, is 1.5, and 40 ppm by weight respectively, while the amount of divinyltetramethyldisiloxane is 700 ppm by weight.

The pot-life shown in the following table is determined at 23° C.

TABLE 4

| Composition | Pot-life in minutes |
|---|---|
| Example 5(d) | 48 min. |
| Comparison Example 1 | (approx.) 3 min. |
| Comparison Example 2 | 51 min. |

The above Table shows that the amount of platinum catalyst may be reduced by 3.75 percent by weight and still achieve substantially the same pot-life when 1,3-divinyl-1,1,3,3-tetramethyldisiloxane is employed in the composition. Due to its relatively high platinum content, the elastomer prepared in accordance with Example 5(d) was not tacky after 24 hours, while the elastomer prepared from the composition of Comparison Example 2 was still somewhat tacky after 4 days. In order to prepare a non-tacky elastomer after 24 hours from the composition prepared in accordance with Comparison Example 2, it is necessary to expose the composition to nitrogen or oxygen as a protective gas during the crosslinking step.

EXAMPLE 6

(2) A portion of a mixture comprising the following 515 gm of a dimethylpolysiloxane having terminal vinyldimethylsiloxane units and a viscosity of 20,000 cP at 23° C,
725 gm cristobalite meal and
19 gm of pyrogenically produced silicon dioxide having hydrophobic properties is mixed with 35 ppm by weight of platinum, calculated as platinum and based on the weight of said portion, in the form of the 1 percent by weight of platinum-vinyl-siloxane-complex and diluent, whose preparation was described above; thereafter said portion of the composition is mixed with 80 ppm by weight of 1,3-divinyl-1,1,3,3-tetramethyldisiloxane and finally with 2.5 percent by weight based on the weight of said portion, of the organopolysiloxane having Si-bonded hydrogen atoms described in Example 3.

COMPARISON EXAMPLE 3

For comparison purposes the process described in Example 6(a) is repeated, except that the divinyl-tetramethyldisiloxane is omitted.

COMPARISON EXAMPLE 4

For the purposes of comparison, the process described in Comparison Example 3 is repeated except that only 3 ppm of platinum, calculated as platinum, is used.

COMPARISON EXAMPLE 5

For comparison purposes the process described in Example 6(a) is repeated, except that a copolymer described in U.S. Pat. No. 3,699,073, which is end-blocked with trimethylsiloxy units and contains dimethylsiloxane and vinylmethylsiloxane units in a molar ratio of approximately 4:1 and having a viscosity of 100 cP at 23° C is substituted for the divinyltetramethyldisiloxane at the rate of 500 ppm by weight, based on the weight of the portion used.

Table 5 shows the pot-life of the various compositions as determined at 23° C and the time required for the compositions to crosslink to form elastomers having a Short-A-hardness of 48:

TABLE 5

| Compositions | Pot-life | Time A-hardness of 48: |
|---|---|---|
| Example 6(a) | 4 min. 20 sec. | 11 min. |
| Comparison Example 3 | 1 min. 40 sec. | 6 min. |
| Comparison Example 4 | 4 min. 10 sec. | 35 min. |
| Comparison Example 5 | 4 min. 25 sec. | 45 min. |

Table 5 shows that in comparison to the prior art, the process of this invention substantially extends the pot-life while only slightly extending the time for crosslinking. This property is highly desirable in dental impression compositions.

What is claimed is:

1. An improved process for controlling the rate of addition of silicon bonded hydrogen atoms to organopolysiloxanes containing at least 50 silicon atoms per molecule and having aliphatic multiple bonds at room temperature in the presence of a platinum catalyst, the improvement which comprises mixing at least one organosilicon compound having the formula

in which R is selected from the class consisting of monovalent hydrocarbon radicals and substituted monovalent hydrocarbon radicals free of aliphatic unsaturation and n is a number of from 0 to 6 with (1) an organopolysiloxane containing silicon bonded hydrogen atoms or (2) an organopolysiloxane having at least 50 silicon atoms per molecule and containing aliphatic unsaturation, prior to combining organopolysiloxanes (1) and (2) in the presence of the platinum catalyst.

2. The improved process of claim 1, wherein the organosilicon compound having the formula

is present in amount of from 1 to 5,000 ppm by weight, based on the total weight of the composition.

3. The improved process of claim 1, wherein the organosilicon compound having the formula $$CH_2=CHR_2SiO(SiR_2O)_nSiR_2CH=CH_2$$

is present in an amount of from 1 and 1,000 ppm by weight, based on the total weight of the composition.

4. The improved process of claim 1, wherein $n$ is 0, 1 or 2 and is a methyl radical.

5. The improved process of claim 1, wherein at least a portion of the organopolysiloxane (2) containing at least 50 silicon atoms per molecule and aliphatic unsaturation is mixed with a platinum catalyst prior to the addition of the organosilicon compound having the formula $$CH_2=CHR_2SiO(SiR_2O)_nSiR_2CH=CH_2$$

wherein R is selected from the class consisting of monovalent hydrocarbon radicals and substituted monovalent hydrocarbon radicals free of aliphatic unsaturation.

* * * * *